United States Patent Office 3,516,865
Patented June 23, 1970

3,516,865
ELECTROCHEMICAL CELL INCLUDING IRON-CHROMIUM ALLOY CONDUCTOR CONNECTED TO CATHODE
Craig S. Tedmon, Jr., Scotia, and Donald W. White, Burnt Hills, N.Y., assignors to General Electric Company, a corporation of New York
No Drawing. Filed Aug. 30, 1967, Ser. No. 664,271
Int. Cl. H01m 27/04
U.S. Cl. 136—86                    3 Claims

ABSTRACT OF THE DISCLOSURE

The use of iron-chromium alloys is disclosed as an electrical conductor in an electrical device, for example as a lead wire in a high temperature fuel cell, normally operating at temperatures in excess of 500° C. in an oxidizing atmosphere. Alloy compositions may range from between about Fe–15% Cr to about Fe–85% Cr with small amounts of alloying agents (up to about 2 wt. percent each alloying agent, such as yttrium, hafnium, zirconium and thorium, used) being added to those iron-chromium alloys containing greater than about 45 weight percent chromium, where there is need to improve oxidation resistance and resistance to nitrification.

In addition a process for the fabrication of iron-chromium alloys containing more than 27% chromium is described.

BACKGROUND OF THE INVENTION

For an electrical conductor to operate satisfactorily at elevated temperatures in an oxidizing atmosphere, it must be resistive to corrosion and progressive oxidation. As an example, a particularly unfavorable atmosphere for electrical conductors exists at the cathode in high temperature fuel cells, wherein the chemical energy of a fuel is directly converted into electrical energy. Such fuel cells, because they generate low voltage direct current power on a continuous basis may have application in various chemical process industries, such as in the manufacture of aluminum and the electro-refining of copper, and for the operation of direct current motors. Waste heat can be effectively employed in the operation of fuel cells, which at the present time operate at temperatures in the range of from about 800° C. to 1200° C. Such fuel cells and their operations are described in U.S. Pat. 3,138,487—Tragert, issued June 23, 1964.

The surface of the electrical conductor, for example a wire, must be resistant to corrosive attack and must be inert to avoid chemical interaction, such chemical activity being considerably aggravated at temperatures above about 1000° C. Various composite conductors such as aluminum-clad copper, stainless steel-clad copper and nickel-clad copper have been used at elevated temperatures, however, the aluminum-clad copper can be used only up to about 300° C. and the other constructions have an upper limit of less than 500° C. Although platinum or gold may be used as high temperature conductors, use thereof is limited by cost.

SUMMARY OF THE INVENTION

It has been determined that electrical conductors made from iron-chromium alloys having a chromium content in the range of from 15 weight percent to 85 weight percent chromium will function adequately as the electrical conductors connected to the fuel cell cathodes. The preferred alloy compositions for this use have a chromium content ranging from about 45 weight percent chromium to about 70 weight percent chromium. Such iron-chromium alloys have been used in the cathode current collector circuit of a high temperature, solid electrolyte fuel cell operated at temperatures of over 1000° C.

In these high temperature oxidizing environments electrical conductors prepared from the aforementioned iron-chromium alloys will form a protective, electrically conductive $Cr_2O_3$ scale, which is very resistant to spalling particularly in the lower chromium content alloys (below about 50 weight percent Cr). The resistance to spalling of the protective $Cr_2O_3$ scale formed on iron-chromium alloys having the higher chromium contents (above about 60 weight percent Cr) can be improved by the addition of small amounts (up to about 2 weight percent) of alloying agents such as yttrium, hafnium, zirconium, and thorium.

Actually, iron-chromium alloys, which contain as little as 13 weight percent chromium, may be used as high temperature electrical conductors in oxidizing environments. However, as the chromium content becomes depleted below 13 weight percent at the metal-metal oxide interface through the formation of $Cr_2O_3$ scale and cannot be replenished to at least 13 weight percent from the metal matrix due to depletion of the chromium content of the metal matrix, $Cr_2O_3$ is thermodynamically unstable with respect to the oxides of iron. Under such conditions the $Cr_2O_3$ scale is no longer protective, although for certain short-term applications iron-chromium alloys having a chromium content in the lower end of the aforementioned range may be used to advantage.

Iron-chromium stainless steels are commonly available commercially; because of the relatively low strength of these materials, they are commonly used in cast form. However, there are iron-chromium alloys, either with or without small alloying additions, commercially available in wrought form having a maximum chromium content as high as 25–27 weight percent chromium. These alloys are readily fabricable to wire or sheet form using conventional fabrication techniques. However, attempts to work iron-chromium alloy castings containing more than 27 weight percent chromium have been stubbornly resisted by the formation of sigma-phase iron-chromium using standard fabrication practices. Therefore, in order to prepare wrought forms of iron-chromium alloy having a chromium content of greater than 27 weight percent chromium formation of the sigma-phase had to be avoided. The process by which iron-chromium alloys of iron-chromium composition corresponding to the sigma-phase composition can be fabricated without forming the sigma-phase is described in detail below.

DETAILED DESCRIPTION OF THE INVENTION

It is desirable to have a very high chromium content iron-chromium alloy in the wrought form for the preparation of electrical conductors in accordance with this invention in order to maximize the lifetime of the current collector in an oxidizing atmosphere. Some $Cr_2O_3$ scale will inevitably be lost due to spalling, particularly in the case of significant temperature cycling and the rejuvenating formation of additional scale must draw its chromium content from the alloy body itself. Opposing this objective of maximum chromium content is the necessity for the presence of a substantial percentage of iron in the alloy in order to prevent the formation of chromium nitride, another composition detrimental to fabricability because of the reduction of ductility by the presence thereof in the grain boundaries.

For those applications in which thermal expansion of the electrical conductor must be minimized it has been found that at temperatures in the vicinity of 1100° C. (a typical operating temperature for a high temperature, solid electrolyte fuel cell) there is a maximum in thermal expansion in the iron-chromium system corresponding to the composition range of 20 to 30 weight percent chromium. Therefore, when thermal expansion is a significant design factor the electrical conductor should have an iron-chromium composition in the range of composition indicated hereinabove as the preferred range.

It has been determined that the protective oxide product of these alloys, $Cr_2O_3$, is stable in the presence of solid stabilized zirconia electrolyte, of stabilized zirconia-base electrolytes and, as well, of the oxide cathode materials employed in high temperature fuel cells.

To complete this invention, it was necessary to prepare iron-chromium alloys containing over 27 weight percent chromium in the wrought form and it was found that higher percentage chromium alloys can be so fabricated, if precautions are taken to avoid the formation of sigma-phase iron-chromium. It was found that this formation can be avoided by hot-working the alloy at temperature above about 900° C. and thereafter working the alloy at temperatures below about 300° C., for the additional low temperature working that is required to complete the fabrication. The periods of operation at 900° C. and above or 300° C. and below are immaterial. Both wire and sheet have been prepared from the cast form of iron-chromium having a composition (55 weight percent Fe-45 weight percent Cr) corresponding to iron-chromium content of the sigma-phase.

As has been stated hereinabove, the successful use of the electrical conductor of this invention as the cathode lead wire in a high temperature fuel cell is a clear indication of the utility thereof under severe conditions of corrosion and heat. The iron-chromium alloy lead wire of this invention is either connected directly to the cathode current-collector structure, which in turn is embedded in the cathode layer or else is connected to a short length of lead wire of some other material, as for example platinum or silver palladium projecting from the cathode layer.

Therefore, the instant invention offers a less expensive corrosion-resistant electrical conductor for high temperature operation, even at temperatures in excess of 1000° C., in an oxidizing environment.

What we claim as new and desire to secure by Letters Patent of the United States is:

1. In a high temperature electrochemical cell normally operating at temperatures in excess of about 500° C., said cell comprising an anode layer and a cathode layer separated by a layer of solid oxygen-ion electrolyte and having an electrical conductor connected to said cathode whereby said electrical conductor is exposed to an oxidizing atmosphere, the improvement wherein the electrical conductor is made of wrought iron-chromium alloy having a chromium content ranging between 15 weight percent chromium and 85 weight percent chromium with the balance being substantially pure iron.

2. The improvement substantially as recited in claim 1 wherein the electrical conductor is made of an iron-chromium alloy having a chromium content ranging between about 45 weight percent chromium and 70 weight percent chromium.

3. The improvement substantially as recited in claim 2 wherein the iron-chromium alloy contains up to about 2 weight percent of an alloying agent selected from the group consisting of yttrium, hafnium, zirconium and thorium.

References Cited

UNITED STATES PATENTS

| | | | |
|---|---|---|---|
| 2,276,188 | 3/1942 | Greger | 136—86 |
| 2,716,670 | 8/1955 | Bacon | 136—86 |
| 2,829,046 | 4/1958 | Richardson | 75—126 |
| 3,031,297 | 4/1962 | Baronow | 75—126 |
| 3,118,762 | 1/1964 | Weatherley | 75—126 X |
| 3,215,562 | 11/1965 | Hindin | 136—86 |
| 3,271,138 | 9/1966 | Ohtake et al. | 75—126 X |

FOREIGN PATENTS 369,920    3/1932    Great Britain.

ALLEN B. CURTIS, Primary Examiner

U.S. Cl. X.R.

75—126